United States Patent [19]

Devault

[11] Patent Number: 4,903,637
[45] Date of Patent: Feb. 27, 1990

[54] FOLDABLE HOUSE AND CARRIER FOR SMALL PETS

[76] Inventor: Jack D. Devault, 238 W. Main, Hope, Id. 83836

[21] Appl. No.: 203,125

[22] Filed: Jun. 7, 1988

[51] Int. Cl.⁴ .............................................. A01K 1/00
[52] U.S. Cl. ...................................................... 119/19
[58] Field of Search .................... 119/1, 19, 17, 20; 217/13, 15, 57; 220/6; 52/70

[56] References Cited

U.S. PATENT DOCUMENTS

| | | | |
|---|---|---|---|
| 489,711 | 1/1893 | Mandioni | 220/6 |
| 635,794 | 10/1899 | Mason | 119/19 |
| 3,280,796 | 10/1966 | Hatcher | 119/19 |
| 3,324,831 | 6/1967 | St. Onge | 119/19 |
| 3,581,708 | 6/1971 | Beck | 119/19 |
| 4,085,762 | 4/1978 | O'Brien et al. | 119/19 |
| 4,109,427 | 8/1978 | O'Brien et al. | 119/19 |
| 4,195,593 | 4/1980 | Dunn | 119/19 |
| 4,295,446 | 10/1981 | Voss | 119/19 |
| 4,348,982 | 9/1982 | Selby | 119/1 |
| 4,391,223 | 7/1983 | Holland et al. | 119/19 |
| 4,603,658 | 8/1986 | Garnsey | 119/19 |
| 4,792,082 | 12/1988 | Williamson | 119/1 X |

FOREIGN PATENT DOCUMENTS 2315226 2/1977 France .................... 119/19

*Primary Examiner*—Paul J. Hirsch
*Attorney, Agent, or Firm*—Keith S. Bergman

[57] ABSTRACT

A container, to house or carry small household pets, that may be quickly and manually formed between an erected use mode and a flat folded storage mode. The container is of gable roofed house configuration in its erected mode and comprises an interconnected structure formed by hingeably related rigid planar elements that occupy a relatively small volume in the folded storage mode. Handles carried by the roof provide aid in manual carriage, releasable fasteners maintain either erected or storage mode, and an end wall provides a selectively latchable door.

1 Claim, 2 Drawing Sheets

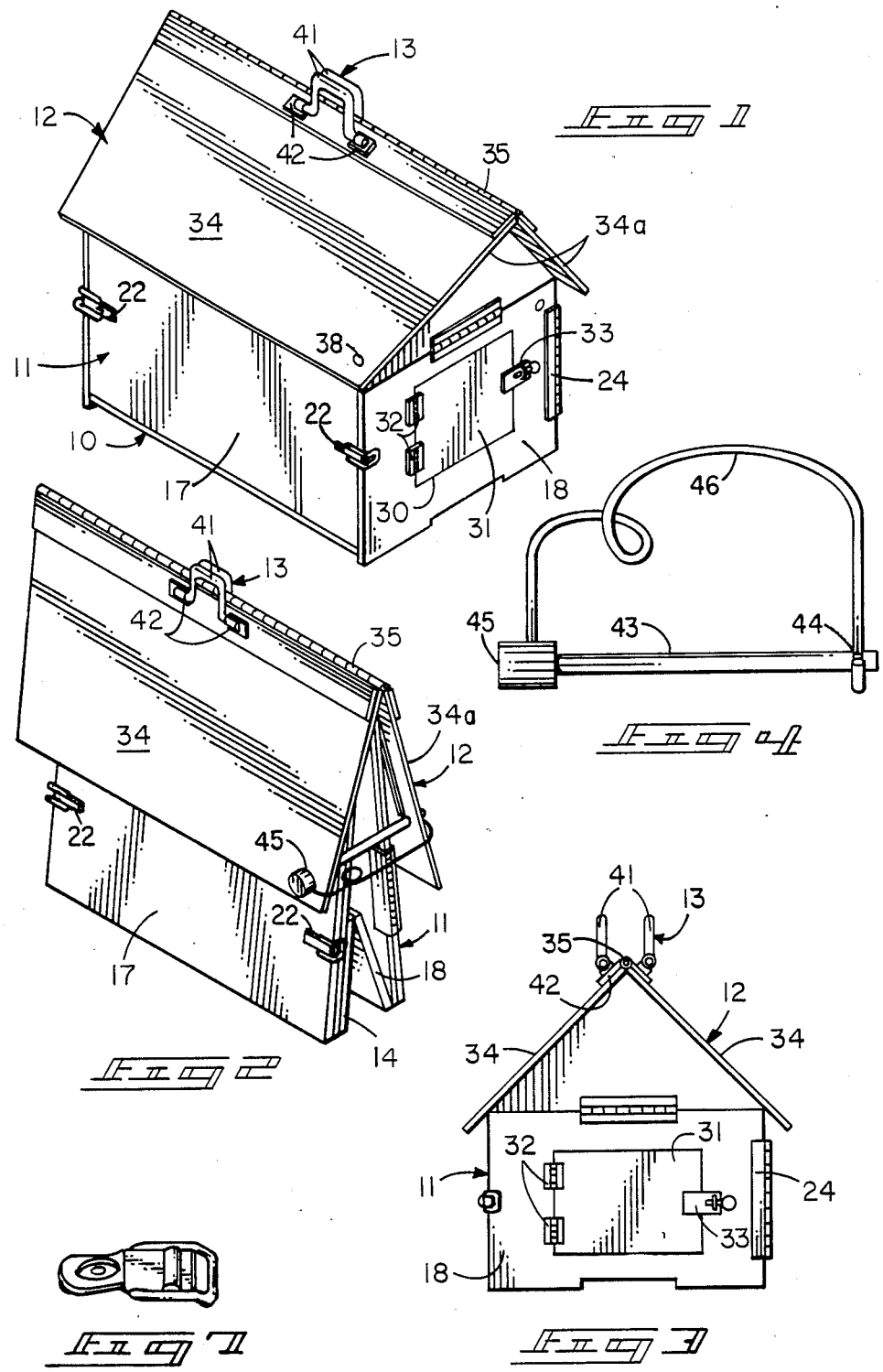

U.S. Patent  Feb. 27, 1990  Sheet 2 of 2  4,903,637
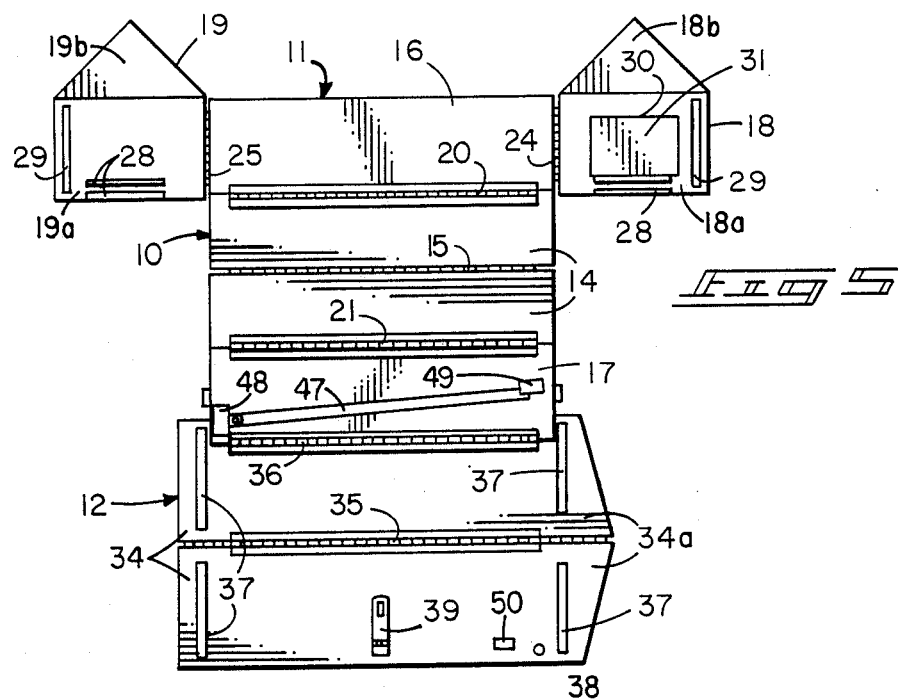
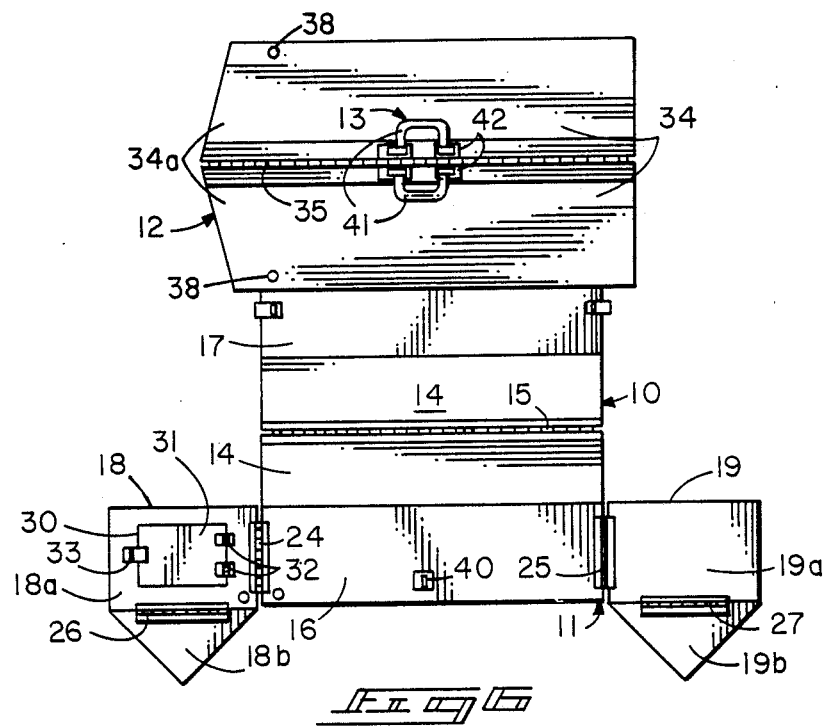

FOLDABLE HOUSE AND CARRIER FOR SMALL PETS

BACKGROUND OF INVENTION

Related Applications

There are no applications related hereto heretofore filed in this or any foreign country.

Field of Invention

My invention relates generally to containers for housing and transport of small pets and more particularly to such containers that are erectable from foldable interconnected planar elements.

Background and Description of Prior Art

The housing of domestic animals in general, and especially of smaller household pets, has undoubtedly provided problems as long as pets have been known. This problem has materially exacerbated in modern day culture. Most smaller domestic pets are kept within a human household to some degree, but almost universally they are outside of that household periodically and during such time it normally is desirable that those pets have some form of housing or shelter. Such shelter must be so configured and constructed as to serve its primary purpose, but yet it is most desirable that it be inexpensive, portable and preferably collapsible in some fashion for storage and transport about the environs of a residential property.

Heretofore various compound housing structures having releasably or movably interconnected parts have become known to fulfill this need, but most of such known structures have not become popular in the marketplace, largely because of a complex nature, low reliability and high cost. The instant invention provides a new and novel member of this class of device having foldably interconnectable elements and, aside from its differences in specific structures, is distinguished from the other known members of the class by providing a durable container that may be used not only for housing but also for containment or transport of pets while yet doing so in an inexpensive and durable fashion.

An additional problem with domestic pet housing in modern society is the space that such housing takes from other uses in an already generally crowded environment. This problem has been considered in the past and the general solution that has resulted has been to make an erectable type structure that may be disassembled in some fashion to a smaller volume for storage. This disassembliable feature may be advantageously accomplished by hingeable interconnection of planar structural elements which maintains all of those elements in an interconnected relationship at all times to prevent loss and to have all parts readily available when needed. My invention provides a device of this type while yet embodying its other novel features.

It is often necessary to transport small domestic pets for various purposes and commonly some sort of container is used for such activities to provide for the safety of the pet and others around it and to prevent its loss. Commonly heretofore separate and independent containment structures, having no other use, have been provided specifically for this purpose. These separate structures are not only expensive to acquire but also exacerbate storage problems as they themselves occupy space for storage and that space is generally fairly substantial. My invention solves this problem by providing a combination structure that serves not only for housing, but also as a container for transportation.

With the advent of modern manufacturing materials, various plastic, wood and paper products similar to plywood or multi-ply cardboard have been developed to provide rigid sheet material of reasonable strength and durability that essentially have all of the desired features of heavier, more massive materials of the past, but yet are substantially less expensive and lighter. My invention is particularly adaptable to the use of such materials and with them generally allows the use of simple, inexpensive hinge and fastening devices, even as of a fabric nature, all to make my structure most economical of manufacture. Even though my structure may be formed of such materials and with foldable structure to allow compaction, it still provides sufficient strength to allow multiple stacking for storage or use and to support a large person as a seat.

My invention resides not in any one of these particular features, per se, but rather in the synergistic combination of all of its structures to provide the functions necessarily flowing therefrom.

SUMMARY OF INVENTION

My invention in general provides a hingeably foldable container with configuration of a simple gable roofed house. The container is formed of hingeably interconnected planar elements that may be folded to a collapsed storage mode occupying substantially minimal volume and yet simply and easily unfolded to an erected mode for use. Both operations are accomplished by manual manipulation and without the required use of tools. Fasteners allow either mode to be releasably maintained. The container provides a handle structure to aid carriage, a fastenable door to maintain closure for pet containment and traditional amenities of normal pet housing.

In creating such a structure, it is:

A principal object of my invention to provide a relatively light weight foldable pet container that is adapted for use for either housing or containment during transport.

A further object of my invention to provide such a container that is foldable to a substantially minimal volume for storage or transport, but erectable by manual manipulation without the use of tools to a containment mode.

A further object of my invention to provide such a container that has a floor and the traditional shape of a simple gable-roofed house.

A further object of my invention to provide such a container that has fastening devices to releasably maintain both the collapsed storage mode and the erected use mode.

A further object of my invention to provide such a container that has handle means to aid its carriage and a releasably fastenable door structure to maintain closure for pet confinement.

A further object of my invention to provide such a container that may be readily opened to allow cleaning and other service activity.

A still further object of my invention to provide such a structure that is of new and novel design, of rugged and durable nature, of simple and economic manufacture and one otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings, as is required. BRIEF DESCRIPTION OF DRAWINGS In the accompanying drawings which form a part hereof and wherein like numbers of reference refer to similar parts throughout:

FIG. 1 is an isometric surface view of my container in an erected mode showing various of its parts, their configuration and relationship.

FIG. 2 is an isometric surface view of the container of FIG. 1, taken from substantially the same view point, but showing the structure in a folded mode.

FIG. 3 is an orthographic front view of my container showing particularly the carrying handles and latch means.

FIG. 4 is an isometric view of a fastener that releasably maintains the folded mode of my container.

FIG. 5 is a plan view of the various panels of my invention in an unfolded mode showing their configuration, interconnection, and relationship with each other.

FIG. 6 is an orthographic plan view of the under surface of the structure shown in FIG. 5.

FIG. 7 is an isometric view of a particular fastener that may be used to releasably fasten the sides of my container in the assembled mode.

DESCRIPTION OF THE PREFERRED EMBODIMENT

My invention generally provides hingeably interconnected floor 10, side walls 11 and roof 12 which provides carrying means 13, to define a container for housing or containment of small domestic animals.

In specifying my invention, the relative terms "front" and "back" and "up" and "down" are used with reference to FIG. 1, with the "front" being the end to the right in that illustration having the entryway and "rear" being the end to the left (not shown). The terms "right" and "left" are used as they would exist for a viewer in front of the structure looking toward it.

Floor 10 of my container provides similar elongate half floor elements 14 hingeably connected to each other along their adjacent medial edges by hinge 15 communicating between those adjacent edges. The absolute dimensions of these elements is not particularly critical and should be styled for the size of a particular pet which the structure is to accommodate. Normally the longer dimension of the floor will be approximately 16 inches and the perpendicular shorter dimension of each half 14 will be approximately 4 inches for ordinary cats and dogs of similar size. Hinge 15 should be such as to allow for the upward folding of the lateral edges of floor halves 14 toward each other from a coplanar position and to limit their downward folding past the coplanar alignment of such elements.

Side wall structure 11 includes right side 16, left side 17, front end 18 and rear end 19. Each end has the same horizontal dimension as the edge of adjacent floor element 14 and its vertical dimension may vary according to the size of an animal to be accommodated, with about 8 inches being normal for an ordinary household cat or dog of similar size. Each of the side elements 16, 17 is interconnected by hinges 20 and 21, respectively, to the adjacent lateral side edges of floor halves 14. This hingeable interconnection is on the inner surfaces of both interconnected elements and should be such as to allow the floor and side elements to move from their erected perpendicular relationship, as illustrated in FIG. 1, to a relationship wherein the sides are substantially coplanar with the floor element, as illustrated in FIG. 5. This hingeable interconnection normally will extend only to a spaced distance from the ends of the joined sides to avoid interference of the hinge with the assembled end structures.

Right side 16 interconnects front end 18 at its forward edge and rear end 19 at its rear edge by hinges 24, 25, respectively, which allow the interconnected elements to move from their perpendicular erected relationship to the coplanar relationship illustrated in FIG. 5.

The front and rear ends are both of similar peripheral configuration with medial rectilinear portions 18a, 19a forming the container side wall and triangularly shaped gable portion 18b, 19b enclosing the space between the rectilinear side wall and the roof structure. The gable portions, in the instance illustrated, are hingeably interconnected to the associated rectilinear portions by hinges 26, 27 respectively to allow these gable portions to fold to aid the compact folding of the entire structure. Hinges 26, 27 are on the outside of the front and rear end structures to allow the gable elements to fold with the two outside surfaces of each set of interconnected elements in adjacency. Both end elements carry horizontal blocking 28 and vertical blocking 29 to fit immediately adjacent bottom 10 and left side 17, respectively, to aid in maintaining the structural integrity and rigidity of the container in its erected mode. This blocking is not necessary but is desirable.

Front end 18 defines medial orifice 30 optionally closable by door 31 and, in the instance illustrated, of rectilinear configuration. Door 31 is adapted to movably fit within orifice 30 and is mounted for pivotal motion relative to that orifice by hinges 32 at one side. The door is releasably positionably maintained in orifice 30 by latch and eye structure 33 at the side opposite the hinges. The sizing of the door must of necessity be smaller than front end 18 to allow its definition, but otherwise its dimensioning is not critical so long as it be of appropriate configuration to allow ingress and egress of a particular animal to be housed. The peripheral configuration of the door is not essential and for some animals a circular orifice may be more appropriate, though it is more difficult to create and to hingeably mount.

the peripheral configuration of ends 18, 19, though not limited essentially, is constrained by their relationship with the other parts of my container. The width of end portions 18, 19 should be the same as the dimension, in the same direction, of bottom 14. The members should be carried on right side wall 16 in such position that when the entire container is assembled, the lower portion of each end is immediately outwardly adjacent the forward and rearward edges of bottom 14 respectively. Floor 14 is preferably, but not necessarily, carried spacedly above the lower edge of the front and rear end elements. The gable portion of each end structure determines the roof pitch and should be such as to fill the space between the rectilinear portion of that end and a roof to be supported by the container.

The side walls, and particularly the left side, front and back, are releasably fastened together by latches 22. In the instance illustrated, these latches are of the so-called "trunk" type, as illustrated in FIG. 7, with hasp portion 22 carried by one structural element and having fastener portion 23 bent in its end portion to releasably engage the other interconnected structural element. This particular latch is not essential to my invention and other known releasable fastening devices performing a similar function may be used.

Roof 12 comprises two similar planar halves 34 of trapezoidal shape that are each mirror images of the other. Each roof half has a length somewhat greater than the longer dimension of floor 10 to provide an overhang in the rearward and forward portions of the structure. Preferably forward portion 34a overhangs somewhat further than the rearward portion to provide more protection over the entry orifice of the container. The two halves of the roof are hingeably interconnected at their medial adjacent edges by elongate hinge 35 which is positioned on the outer surface of the roof to allow elements 34 to fold toward each other from their angulated roof forming configuration.

The left roof element is hingeably connected on its inner surface to the inner surface of the top edge portion of left side element 17 by hinge 36 communicating therebetween. This hinge is so positioned on the roof element as to allow the container to be assembled with the apex or hingeable interconnection between roof halves 17 positioned at the apex of the gable defined by the front and rear ends when the container be assembled.

Each roof half 34 optionally mounts elongate blocking 37 on its inner or under surface to fit immediately outwardly adjacent gable portions 18b, 19b of the front and rear end elements to add further structural integrity and rigidity to the assembled structure. The right roof half also provides hasp 39 to, with the container in an assembled condition, extend downwardly upon the outer surface of right side 16 and communicate with eye 40 carried by that side to provide means to releasably lock the container structure in the assembled mode by means of a fastener (not shown) such as a padlock, snaphook or similar device.

Elongate support 47 may optionally be provided to maintain the roof in an open condition when desired for container cleaning, servicing or otherwise. The support is biasedly but movably carried at one end by mounting structure 48 on the inner surface of left side 17. The other end of the support carries fastening structure 49 to fit within hole 50 defined in the right roof half to support that element in a raised position, if desired.

An end portion of the roof structure defines cooperating aligned fastening holes 38 in the foreward portion of each roof half to allow releasable fastening of the container in its folded or storage mode. A releasable fastening device, as illustrated in FIG. 4, provides elongate body 43 to extend through the fastening holes with one enlarged head 45 at one end carrying bow shaped fastening wire 46 to extend, at a spaced distance from the body, to the second end to there releasably fit in fastening groove 44 defined immediately inwardly adjacent that second end. This particular fastener is not new, per se, and other fasteners of a similar nature could be used with my invention or in fact it is usable, if not so conveniently, without any fastener.

Carrying means 13, in the instance illustrated, comprises similar paired cooperating handles 41 pivotally carried by paired sets of brackets 42 structurally communicating with each side of the roof structure immediately adjacent its hinged apex. These handles are not per se remarkable and are of the traditional type heretofore used on luggage and other similar containers to aid carrying. The handles are positioned substantially at the elongate center of gravity of the container to aid carriage and maintenance in a substantially horizontal orientation during carriage. The particular form of carrying means illustrated is not critical and other carrying means are within the ambit and scope of my invention, such as one or more handles extending perpendicularly to the apex of the roof, a strap or straps fastened at various positions on the container, and other similar structures.

The only requirement of the materials from which my structure is formed is that they be rigid, of appropriate strength and rigidity to sustain the forces imposes upon them, and reasonably durable. Any material that has appropriate physical requirements may be used, though preferably the container is formed of relatively thin planar elements of wood, such as $\frac{1}{8}$ inch plywood, or of sheet-like paperboard products that have similar physical characteristics. Polymeric and resinous sheet materials are also adaptable to the purposes of my invention, but these materials may be more expensive than the plywood or paper derived products.

The hinges of my container are required only to interconnect the elements that they join and again most known hinges that fulfill this function are within the ambit of my invention. Preferably the hinge structures comprises either piano-type hinges with a wood or plastic-type structure or fabric elements that have appropriate deformable resilience with a paper-type structure largely because of the relative expenses and comparability of materials involved.

The permanent non-movable interconnections of container elements may be accomplished by various known methods such as mechanical fasteners, including rivets, nails and screws, or adhesion. If the surface of the container are not formed from material that is resistant to water and other environmental conditions or debris, they preferably will be covered with some type of coating to improve their durability and if desired, this coating may contain various of the known modern pesticide compounds to destroy or abate animal pests and parasites, such as fleas. The interior of the container should present smooth durable surfaces to aid in cleaning animal originated debris of various sorts from within the container.

Having thusly described the structure of my invention, its operation may be understood.

A container is formed, as illustrated in FIGS. 5 and 6, of appropriate dimensions to house a particular animal. The relative proportions of the several elements of the container preferably will remain substantially the same with only the absolute dimension of each changing proportionally. The container size may vary from one to accommodate the smallest of dogs and cats to one for German Sheperds, St. Bernards or Newfoundlands.

The container, after formation, will appear as illustrated in FIGS. 5 or 6. From this configuration, the structure may be folded in modes for storage or use, as desired. The most convenient and compact storage mode is illustrated in FIG. 2. In this mode the two ends, with gable portions folded inwardly, are folded inwardly upon the right side and that right side structure is folded adjacent the inner surface of right bottom half 14. The left bottom half is then folded inwardly upon left side 17 and that left side folded to a medial position adjacent the right side and between the two roof halves.

The roof halves are then positioned over the side and floor structure in an angulated relationship to each other with the carrying handle exposed to allow carriage of the structure. The fastening holes in the roof structure are aligned and fastening pin 43 inserted therethrough to releasably maintain the mode.

The erected mode of the container is accomplished from the flat-folded mode illustrated in FIG. 5 by folding right side 16 upwardly perpendicularly to bottom 14 and then folding the front and back ends perpendicularly to the right side so that they communicate with the forward and rearward edges of bottom 17. Left side 18 is then folded vertically upwardly relative to the floor and the roof then folded over the gable structure toward right side 16. Hasp 39 is then engaged upon hook 40 on the outer right side and releasably secured and side fasteners 22, 23 are fastened. The structure is then in a releasably assembled condition.

It is to be particularly noted that in its erected mode my invention may be used either as a stationary housing facility or as a transportable container for an animal. The door of the device may be releasably maintained in a closed condition, to contain an animal when desired, by means of the latch and eye mechanism 33. In use as a transportation container, both container and contained animal may be readily carried by means of handle structure 41. For the convenient carriage of large dogs it may be necessary to provide multiple handles or other carriage means for simultaneous use by more than one person.

It is further to be noted that my container may be of a rigid durable nature, adapted for animal housing in weather exposed environs, by forming it of plywood panels with metallic piano-type hinges interconnecting the various elements. It yet may be made of a most inexpensive construction, adapted particularly for carriage of small animals, especially outside their traditional home environment, by forming it of rigid pasteboard panels hingeably interconnected by their own structure or fabric-type hinges. Either type of formation, however, may be used for housing or transport purposes and various combinations may provide a structure more adaptable for other particular uses.

The foregoing description of my invention is necessarily of a detailed nature so that a specific embodiment of it may be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A container for the housing, transport and containment of domestic pets comprising, in combination:
    a floor element having two similar elongate planar halves hingeably interconnected along their longer adjacent edges to fold only upwardly toward each other from a substantially coplanar relationship;
    a first side element, of the same a length as the longer edge of the floor element, hingeably interconnected at its lower inner edge to a first lateral edge of the floor element to extend perpendicularly upwardly therefrom;
    similar front and rear end elements each having a lower vertical side wall portion hingeably interconnected, respectively, at opposed vertical end edges of the first side element to fold inwardly relative thereto, each said end element having a triangle-like upper gabled portion hingeably attached to fold upon the outer surface of each side wall portion respectively, said front end element having a door with latch means;
    a second side element, similar to the first side element, hingeably interconnected at its lower inner edge to the second lateral edge of the floor element to extend perpendicularly upwardly therefrom;
    an elongate roof element, longer than the floor element formed of two similar elongate halves hingeably interconnected along their adjacent medial edges, the undersurface of one half of said roof element being hingeably interconnected with the upper inner edge of the second side element;
    plural latch means to releasably fast the roof element to the first side of the container to fasten the front end element and back end element to the second side, and to fasten the roof sides together when in a folded mode; and
    handle means carried by the roof element to aid manual manipulation and carriage of the container.

* * * * *